(12) United States Patent
Sherril et al.

(10) Patent No.: US 9,748,870 B2
(45) Date of Patent: Aug. 29, 2017

(54) ACOUSTIC MECHANICAL FEED-THROUGHS FOR PRODUCING WORK ACROSS A STRUCTURE

(71) Applicant: CALIFORNIA INSTITUTE OF TECHNOLOGY, Pasadena, CA (US)

(72) Inventors: Stewart Sherril, La Crescenta, CA (US); Xiaoqi Bao, San Gabriel, CA (US); Yoseph Bar-Cohen, Seal Beach, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 506 days.

(21) Appl. No.: 14/557,844

(22) Filed: Dec. 2, 2014

(65) Prior Publication Data
US 2015/0155800 A1    Jun. 4, 2015

Related U.S. Application Data

(60) Provisional application No. 61/910,679, filed on Dec. 2, 2013.

(51) Int. Cl.
| | |
|---|---|
| *H01L 41/053* | (2006.01) |
| *H01L 41/09* | (2006.01) |
| *H02N 2/00* | (2006.01) |
| *H02N 2/12* | (2006.01) |
| *H02N 2/04* | (2006.01) |

(Continued)

(52) U.S. Cl.
CPC .............. *H02N 2/12* (2013.01); *H02N 2/0045* (2013.01); *H02N 2/026* (2013.01); *H02N 2/04* (2013.01); *H02N 2/103* (2013.01)

(58) Field of Classification Search
CPC ........ H02N 2/12; H02N 2/0045; H02N 2/026; H02N 2/04; H02N 2/103
USPC .......... 310/323.12, 323.18, 323.19, 328, 333
See application file for complete search history.

(56) References Cited

U.S. PATENT DOCUMENTS

| | | | | |
|---|---|---|---|---|
| 2,981,268 A | * | 4/1961 | McAuley ............... | B08B 3/123 134/1 |
| 3,131,515 A | * | 5/1964 | Mason ..................... | B06B 3/02 228/1.1 |

(Continued)

OTHER PUBLICATIONS

Sherrit, Stewart, et. al., "Acoustic Mechanical Feedthroughs," in Sensors and Smart Structures Technologies for Civil, Mechanical, and Aerospace Systems 2013, edited by Jerome Peter Lynch, Chung-Bang Yun, Kon-Well Wang, Proc. of SPIE vol. 8692, Apr. 25, 2013.

*Primary Examiner* — Thomas Dougherty
(74) *Attorney, Agent, or Firm* — Steinfl + Bruno, LLP (57) ABSTRACT

An apparatus that passes vibrational energy across a mechanical structure lacking a perforation. The disclosed apparatus and method provide the ability to transfer work (rotary or linear motion) across pressure or thermal barriers or in a sterile environment without generating contaminants; the presence of reflectors in the solid barrier to enhance the efficiency of the energy/power transmission, and the ability to produce a bi-directional driving mechanism using a plurality of different mode resonances, such as a fundamental frequency resonance and a higher frequency resonance. In some instances, a plane within the mechanical structure lacking a perforation is a nodal plane of the vibrational energy field.

20 Claims, 7 Drawing Sheets

(51) Int. Cl.
*H02N 2/02* (2006.01)
*H02N 2/10* (2006.01)

(56) References Cited

U.S. PATENT DOCUMENTS

| | | | | |
|---|---|---|---|---|
| 3,381,525 | A * | 5/1968 | Kartluke | G01N 29/02 |
| | | | | 310/26 |
| 3,511,323 | A * | 5/1970 | Riley, Jr. | G10K 11/004 |
| | | | | 126/41 R |
| 4,762,668 | A * | 8/1988 | Loose | G01F 15/12 |
| | | | | 134/1 |
| 4,764,702 | A * | 8/1988 | Mishiro | H02N 2/106 |
| | | | | 310/323.12 |
| 7,902,943 | B2 | 3/2011 | Sherrit et al. | |
| 8,461,744 | B2 * | 6/2013 | Wiener | A61B 17/320092 |
| | | | | 310/323.01 |
| 8,657,027 | B2 * | 2/2014 | Sherrit | B23B 37/00 |
| | | | | 173/2 |
| 8,659,208 | B1 * | 2/2014 | Rose | B06B 1/0261 |
| | | | | 310/26 |
| 8,905,689 | B2 * | 12/2014 | Short | B23B 29/125 |
| | | | | 279/103 |
| 2005/0271559 | A1 * | 12/2005 | Ratcliff | B01D 17/00 |
| | | | | 422/128 |
| 2008/0103418 | A1 * | 5/2008 | Wuchinich | A61B 17/320068 |
| | | | | 601/2 |

* cited by examiner

ACOUSTIC MECHANICAL FEED-THROUGHS FOR PRODUCING WORK ACROSS A STRUCTURE

CROSS-REFERENCE TO RELATED APPLICATIONS

This application claims priority to and the benefit of co-pending U.S. provisional patent application Ser. No. 61/910,679, filed Dec. 2, 2013, which application is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

FIELD OF THE INVENTION

The invention relates to mechanical structures in general and particularly to a mechanical structure that employs an acoustic or vibrational source.

BACKGROUND OF THE INVENTION

There are many systems that rely on macroscopic motion and generate work by direct application of motion generated in an acoustic source to a medium of interest. Examples include such diverse systems as speakers that use mechanical motion to generate sound, ultrasonic cleaners that use mechanical motion to generate waves useful in dissolving materials found on hard surfaces into a liquid medium, and ultrasonic drills that use sound waves to drill throw hard materials.

Known in the prior art is Sherrit et al., U.S. Pat. No. 7,902,943, issued Mar. 8, 2011, which is said to disclose an embodiment that provides electrical energy from a source on one side of a medium to a load on the other side of the medium, the embodiment including a first piezoelectric to generate acoustic energy in response to electrical energy from the source, and a second piezoelectric to convert the received acoustic energy to electrical energy used by the load. In such systems, the repeated conversion of energy from one form to another incurs a penalty at each conversion, because no conversion process is lossless. U.S. Pat. No. 7,902,943 is assigned to the assignee of the present application.

There is a need for improved systems and methods for transmitting power contained in sonic or ultrasonic waves.

SUMMARY OF THE INVENTION

According to one aspect, the invention features an apparatus, comprising: a mechanical structure having a first side and a second side opposite the first side, the mechanical structure lacking a perforation between the first side and the second side; a vibrational actuator situated on the first side of the mechanical structure, the vibrational actuator configured to provide vibrational energy; a work piece situated on the second side of the mechanical structure, the work piece configured to receive vibrational energy and to convert the vibrational energy into mechanical motion.

In one embodiment, the vibrational actuator is a piezoelectric actuator.

In another embodiment, the vibrational actuator is an electrostrictive actuator.

In yet another embodiment, the vibrational actuator is a magnetostrictive actuator.

In still another embodiment, the work piece is configured to convert the vibrational energy into linear mechanical motion.

In a further embodiment, the work piece is configured to convert the vibrational energy into rotary mechanical motion.

In yet a further embodiment, the vibrational actuator is configured to provide vibrational energy at a fundamental frequency.

In an additional embodiment, the work piece is configured to convert the vibrational energy at the fundamental frequency into motion having a first sense.

In one more embodiment, the vibrational actuator is configured to provide vibrational energy at a frequency which is a multiple of the fundamental frequency.

In still a further embodiment, the work piece is configured to convert the vibrational energy at the frequency which is a multiple of the fundamental frequency into motion having a second sense opposite to the first sense.

In one more embodiment, a plane within the mechanical structure is a nodal plane of the vibrational energy.

In another embodiment, the vibrational energy can be described by a periodic function.

According to another aspect, the invention relates to a method of passing vibrational energy through a structure lacking a penetration. The method comprises the steps of: providing an apparatus, comprising: a mechanical structure having a first side and a second side opposite the first side, the mechanical structure lacking a perforation between the first side and the second side; a vibrational actuator situated on the first side of the mechanical structure, the vibrational actuator configured to provide vibrational energy; and a work piece situated on the second side of the mechanical structure, the work piece configured to receive vibrational energy and to convert the vibrational energy into mechanical motion; activating the vibrational actuator to generate vibrational energy; and receiving the vibrational energy with the work piece; and providing mechanical motion generated by a response of the work piece to the received mechanical energy.

In one embodiment, the vibrational actuator is a selected one of a piezoelectric actuator, an electrostrictive actuator, and a magnetostrictive actuator.

In another embodiment, the work piece is configured to convert the vibrational energy into linear mechanical motion.

In yet another embodiment, the work piece is configured to convert the vibrational energy into rotary mechanical motion.

In still another embodiment, the vibrational actuator is configured to provide vibrational energy at a fundamental frequency.

In a further embodiment, the work piece is configured to perform at least one of: convert the vibrational energy at the fundamental frequency into motion having a first sense, provide vibrational energy at a frequency which is a multiple of the fundamental frequency, and convert the vibrational energy at the frequency which is a multiple of the fundamental frequency into motion having a second sense opposite to the first sense.

In yet a further embodiment, a plane within the mechanical structure is a nodal plane of the vibrational energy.

In an additional embodiment, the vibrational energy can be described by a periodic function.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

We describe a novel design of a general method of transferring useful mechanical work across solid barriers by pumping acoustic energy through a resonant structure.

Some of the features of this apparatus and method are the ability to transfer work (rotary or linear motion) across pressure or thermal barriers or in a sterile environment without generating contaminants; the presence of reflectors in the solid barrier to enhance the efficiency of the energy/power transmission, and the ability to produce a bi-directional driving mechanism using a plurality of different mode resonances, such as a fundamental frequency resonance and a higher frequency resonance.

There are many applications that use or could use rotary motors with high torque and low speed as well as high force linear motors. In addition, there are a variety of applications where the presence of a motor is complicated by thermal of chemical environments that would be hostile to the motor components and reduce the life of the motor and, in some instances, not be feasible. One example is operation on a planet such as Venus where the ambient temperature is 470° C. and the surface pressure is 90 atmospheres, in a gas consisting principally of $CO_2$. Reliable motors operating at these temperatures are very difficult to produce and generally they have limited life. The motor or technique disclosed here is based on pumping acoustic energy across a mechanical barrier and converting the acoustic energy directly to useful work in the form of a linear or rotary motion. An example of such an application is shown in FIG. 1A.

Figure 1A:
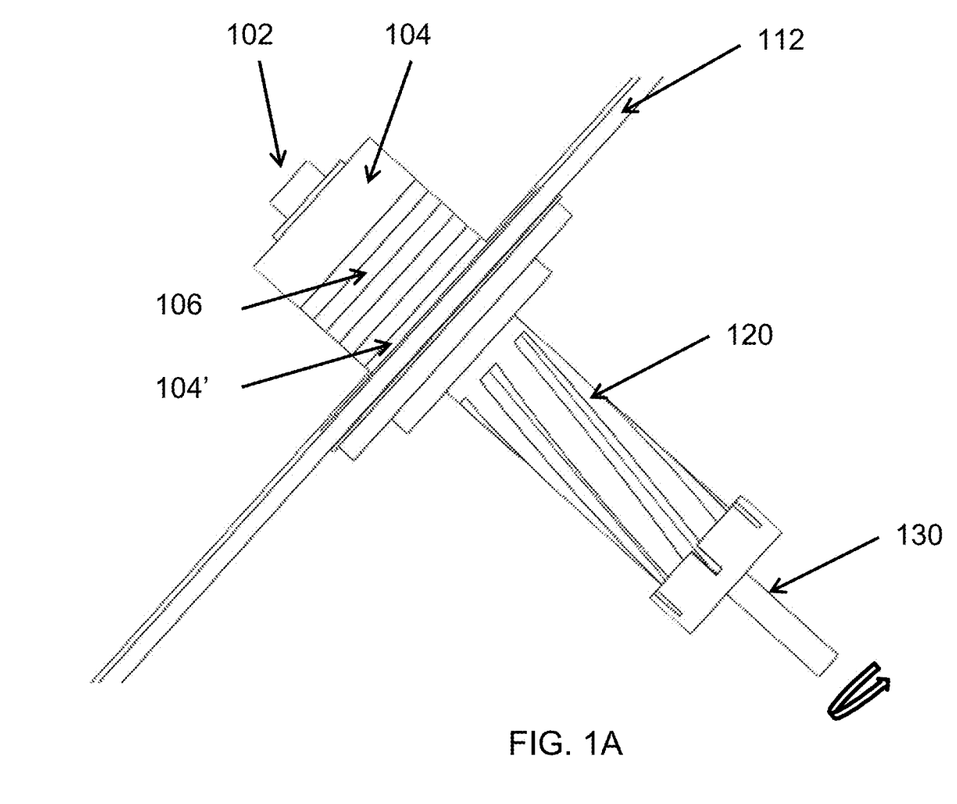
FIG. 1A is a side view of an acoustic mechanical feed-through according to principles of the invention.

FIG. 1A is a side view of an acoustic mechanical feed-through according to principles of the invention. In FIG. 1A, we show a piezoelectric stack 106 compressed by a backing 104, 104' and a stress bolt 102 and an asymmetrically grooved horn 120 separated by the wall 112 (or a barrier) of an enclosure. In some embodiments, the wall 112 is designed to be at the nodal plane of zero displacement. At the resonance frequency, the asymmetric horn twists 120 in one direction during extension and rotates the rotor cap. We have demonstrated horns of this design with rotation in the opposite direction at the $2^{nd}$ fundamental resonance.

Figure 1B:
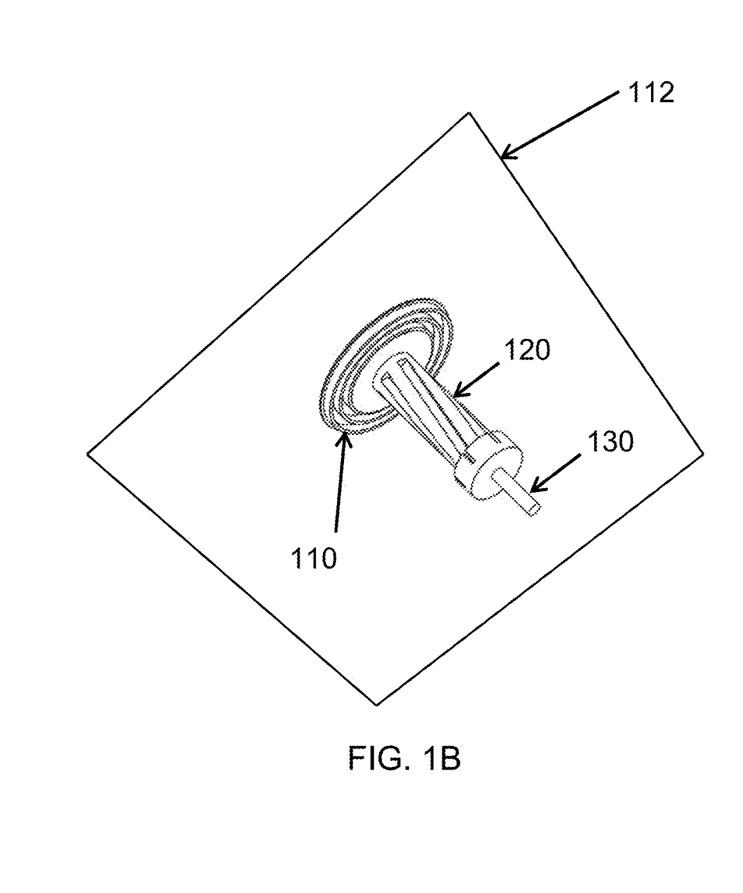
FIG. 1B is a perspective view of a feed-through with reflection rings to reduce the acoustic radiation loss in the wall (or a surface of an acoustic radiator) due to plate waves.

FIG. 1B is a perspective view of a feed-through with reflection rings 110 to reduce the acoustic radiation loss in the wall (or a surface of an acoustic radiator) due to plate waves.

In many applications, it is desirable for most of the acoustic energy to propagate in an axial (the z-axis) direction. The acoustic energy that travels in a direction perpendicular (or radial) to the z-axis (in an x-y plane) represents energy that may be lost. For example, Lamb waves are surface waves that propagate in a direction radial to the z-axis. Some embodiments include one or more components so as to provide a surface discontinuity on one or more faces of a medium to reflect the Lamb waves back to the transmitter or receiver. For example, one or more rings may be placed on a medium surrounding the transmitter to reflect surface waves back to the transmitter, such as the reflectors 110 illustrated in FIG. 1B. As another example, a notch may be formed into the medium, where the notch surrounds the transmitter so as to provide a surface discontinuity, resulting in reflection of the surface waves back to the transmitter.

Figure 2A:
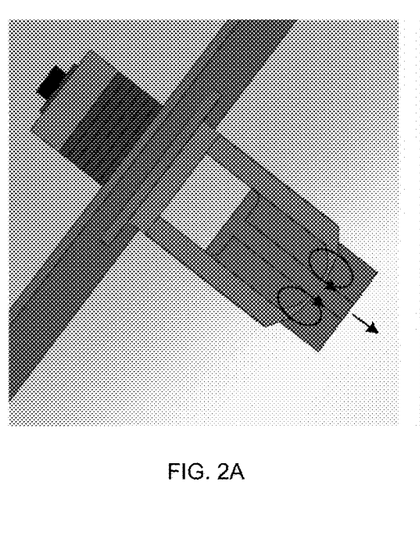
FIG. 2A is a side view of an acoustic mechanical feed-through and linear actuator and a view of the tip motion of the horn tips and the direction of the slide.

Another example is a linear actuator shown in FIG. 2. FIG. 2A is a side view of an acoustic mechanical feed-through and linear actuator and a view of the tip motion of the horn tips and the direction of the slide.

Figure 2B:
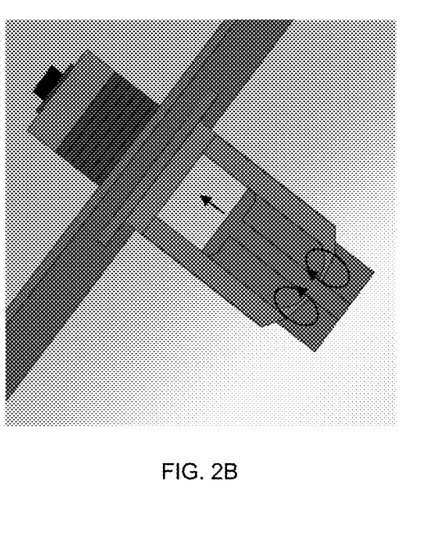
FIG. 2B is another side view of the acoustic mechanical feed-through and linear actuator of FIG. 2A in which the tip is designed to rotate in the opposite direction at the second resonance to produce bi-directional drive.

FIG. 2B is another side view of the acoustic mechanical feed-through and linear actuator of FIG. 2A in which the tip is designed to rotate in the opposite direction at the second resonance to produce bi-directional drive. In this example, instead of twisting the horn, the horn has been designed to clamp and extend similar to that of an inch worm motor to produce linear actuation.

Figure 3:
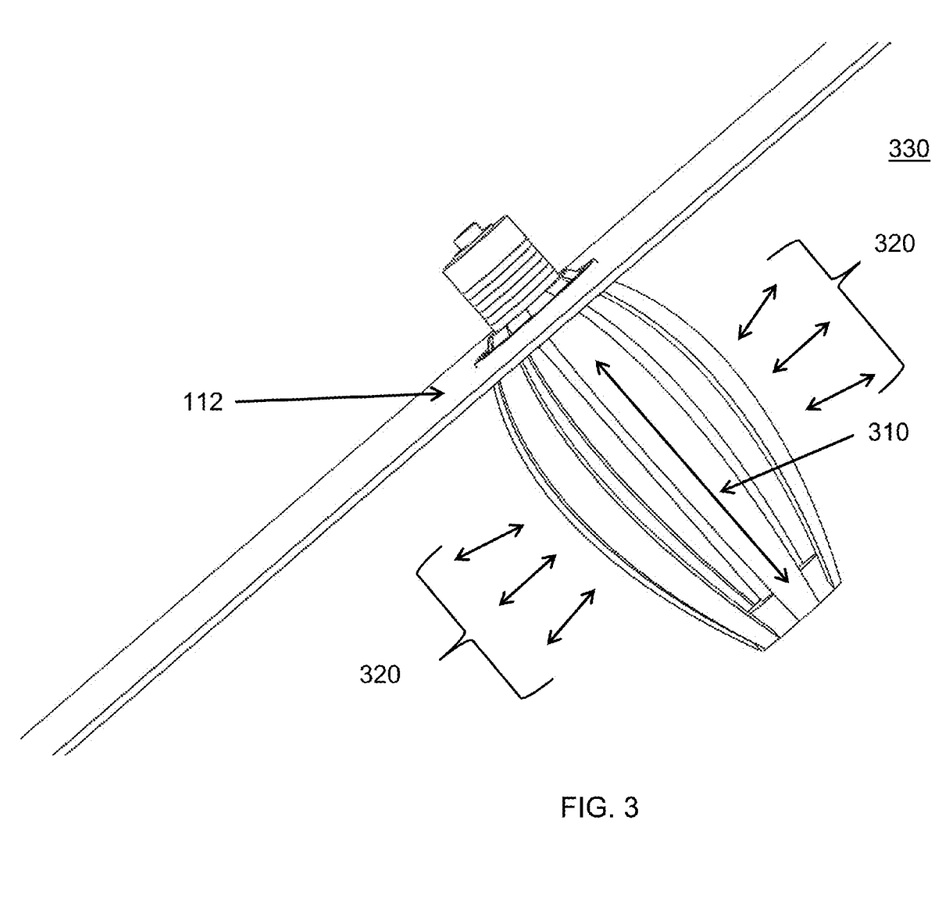
FIG. 3 is a diagram of a Barrel-Stave sonar projector.

Although we are primarily disclosing Acoustic Mechanical Feed-throughs (AMF) for linear or rotary actuation on the other side of a barrier or pressure vessel, they also can be applicable to specific applications such as a barrel-stave sonar projector as shown in FIG. 3 or an internal valve inside a pipe that can be activated externally.

The recognition of the importance of the use of piezoelectric actuators in space and for aerospace applications has significantly grown in recent years. They have been used in a variety of missions, for example the Mars Science Laboratory (the Curiosity Rover) which landed on Mars in August 2012, and which includes over 20 piezoelectric stack actuators. Piezoelectric actuators are attractive for their ability to generate precision high strokes, torques, and forces while operating under relatively harsh conditions (temperatures ranging from single digit K to as high as 1273 K).

FIG. 3 is a diagram of a Barrel-Stave sonar projector. The piezoelectric actuator is tuned to the Barrel-stave projector.

The extension in the horn internal to the barrel staves (illustrated by double ended arrow 310) causes the staves to flex and drive the neoprene boot in a barrel mode extension (illustrated by arrows 320). The Barrel-Stave sonar projector is immersed in a medium 330 such as water.

Electromagnetic motors can have problems when operating in extreme environments. If one needs to do mechanical work on the opposite side of a mechanical structure, it is possible to use electrical feed-throughs to transport the electric power to drive the motor. However, electrical feed-throughs involve perforating a structure, which perforation can create problems if hermetic sealing is required.

Piezoelectric motors can be designed directly with high torques and lower speeds without the need for gears. Generally, piezoelectric materials have been shown to be operational at 500° C.

We have demonstrated that one can actuate piezoelectric, electrostrictive or magnetostrictive materials in on one side of a mechanical structure, for example in a benign environment, and transmit the power in acoustic form as a stress wave and actuate mechanical devices on the other side of the structure, external to the benign environment. This removes the need to perforate a structure and allows work to be done directly on the other side of a structure without the use of electrical feed-throughs which can weaken the structure, pipe or vessel.

We provide a solution to the problem of passing mechanical energy through a structure that does not have mechanical perforations. We disclose a matching actuator and a work piece that can be bolted/fastened into a barrier on either side and tuned to transmit acoustic power across the barrier. In the work piece the acoustic power is converted to rotary or linear motion to do useful work.

We have developed illustrative embodiments that use a piezoelectric actuator one side of mechanical structure lacking perforations and a work piece that produces rotary and/or linear motion on the other side of the mechanical structure without a conventional electrical or mechanical feed-through. In some embodiments, we apply acoustic energy at a set frequency or range of frequencies to produce resonance motion in a structure. The acoustic energy, when transferred across the structure, can be converted into rotary or linear motion. A unique feature of these motors is that they can be designed produce work across a structure without perforating the structure mechanically. The device comes in two parts, an acoustic power source as actuator that generates the acoustic wave and a work piece or end effector as the portion that converts the acoustic energy in the wave to mechanical motion.

Figure 4:
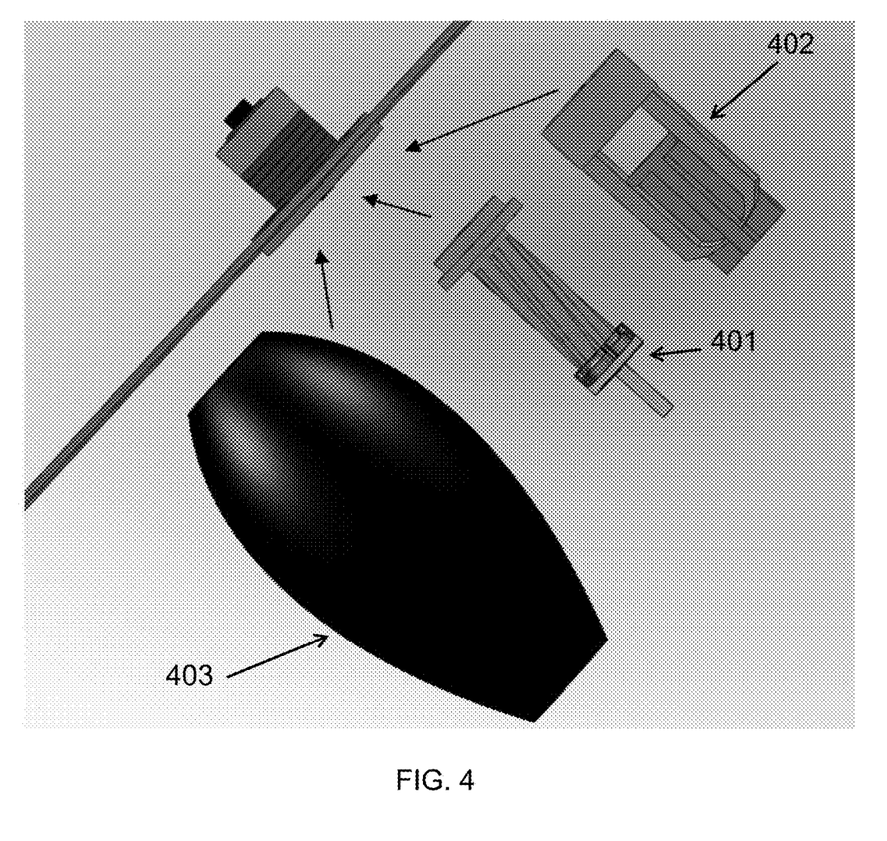
FIG. 4 is an image that illustrates a number of different resonator/end effectors that can be interchangeably driven by the same actuator on the other side of the mechanical structure.

FIG. 4 is an image that illustrates a number of different resonator/end effectors that can be interchangeably driven by the same actuator on the other side of the mechanical structure, such as a resonator/end effector 401 as illustrated in FIG. 1A and FIG. 1B, a resonator/end effector 402 as illustrated in FIG. 2A and FIG. 2B, or a resonator/end effector 403 as illustrated in FIG. 3. As illustrated in FIG. 4, in various embodiments one can use an actuator to provide acoustic energy at a given frequency and can use one of a plurality of different and interchangeable end effectors to produce rotary or linear work.

In various embodiments, one can provide actuators that operate at the same frequency of the driving actuator or produce rotary or linear motion at lower frequencies.

Figure 5:
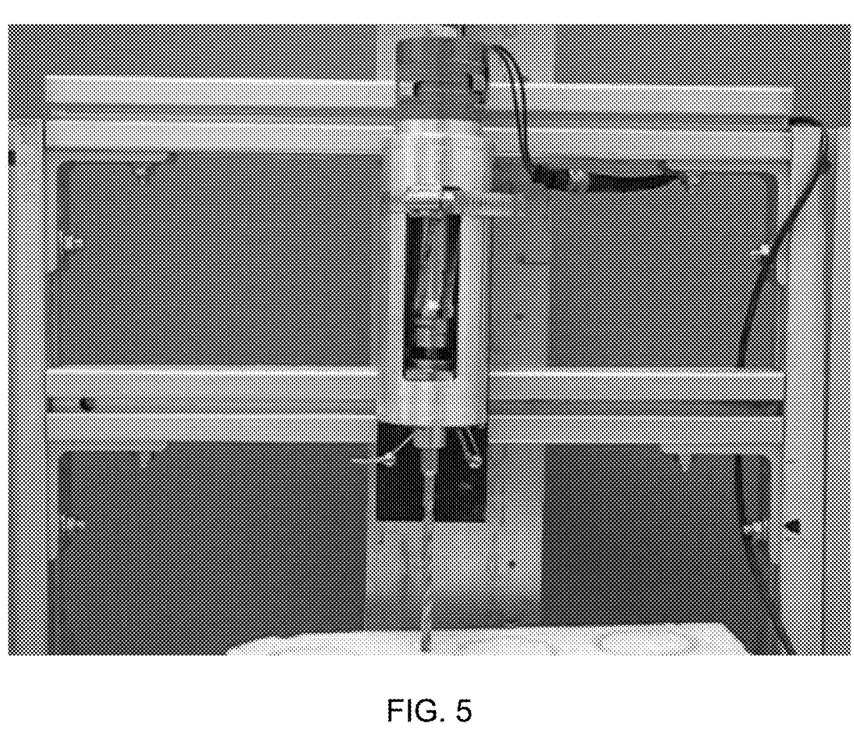
FIG. 5 is an image of a rotary hammer actuator that was developed and demonstrated to rotate at 200 RPM. The horn is mounted to the aluminum tube just above the hose clamp. Since this is a nodal plane it could equally be the wall of some structure since it is the plane of zero motion viewed on a macroscopic scale. We could also shorten the horn and have the rotor clamped on as we showed in FIG. 1.

FIG. 5 is an image of a rotary hammer actuator that was developed and demonstrated to rotate at 200 RPM. The horn is mounted to the aluminum tube just above the hose clamp. Since this is a nodal plane it could equally be the wall of some structure since it is the plane of zero motion viewed on a macroscopic scale. We could also shorten the horn and have the rotor clamped on as we showed in FIG. 1. In some embodiments, the nodal point is located within the wall. In other embodiments, the nodal plane is located outside the dimensions of the wall.

Figure 6:
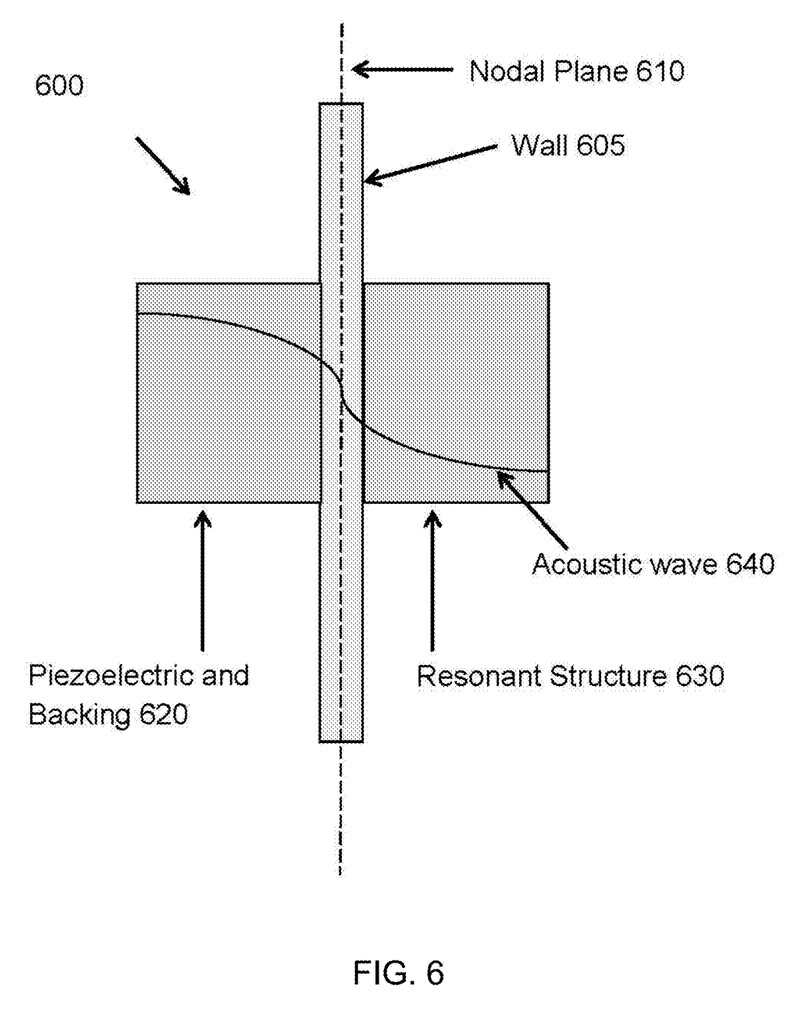
FIG. 6 is a schematic diagram of the acoustic mechanical feedthrough showing the piezoelectric actuator and backing, the wall or mechanical structure lacking perforations, the resonant structure, the acoustic wave and a nodal plane.

FIG. 6 is a schematic diagram 600 of the acoustic mechanical feedthrough showing the piezoelectric and backing 620, the wall 605 or mechanical structure lacking perforations, the resonant structure 630 and the acoustic wave 640 (illustrated as a sinusoidal displacement curve at the half wave resonance). The rotor or slider is not shown. The nodal plane 610 lies within the thickness of the wall in the embodiment illustrated. In other embodiments the resonance could be higher order, e.g., second, third or higher order harmonics of the fundamental frequency. The nodal plane does not necessarily need to lie within the wall thickness.

APPLICATIONS

The piezoelectric rotary and linear motors described herein are fully scalable. In some embodiments, they can be designed to be used in small systems, such as those having dimensions of the order of a few millimeters (micro-motors for consumer electronics) or much larger systems in the meter range, such as sonar projectors and industrial valves. These systems have utility in many environments where linear or rotary actuation is needed including environments that involve chemically caustic or corrosive materials, high temperature environments, high pressure environments, sterile environments, and environments that contain dangerous substances, such as radioactive materials.

As an example of an embodiment in a high pressure environment, consider a high pressure pipe with an internal rotary valve. In conventional practice, one would have to perforate the pipe to provide power to operate the valve. Using the principles of the invention, one may provide an acoustic actuator on the exterior of the pipe, and a rotor structure within the pipe that responds to the acoustic energy generated by the external actuator. The internal valve opens and closes depending on the direction of rotation induced in it. The internal; valve can be designed to close when driven at a first frequency, such as a fundamental frequency of vibration. The valve could be driven at another frequency (higher mode) to open it.

In general terms, one can term one of the actions of opening or closing as motion of a first sense, and the other one of the actions of opening or closing as motion of a second sense opposite to the first sense. Another example of first and second senses of motion would be one action that moves in one direction along an axial direction, and a second action that moves in the opposite direction along the same axial direction, such as an extension along the axial direction and a contraction along the axial direction.

Aspects of the technology have been described by the inventors in Sherrit et al., "Acoustic Mechanical Feedthroughs," Proceedings of the SPIE, Volume 8692, which was published less than one year prior to the filing of U.S. Ser. No. 61/910,679 on Dec. 2, 2013, which publication is incorporated herein by reference in its entirety.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

INCORPORATION BY REFERENCE

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An apparatus, comprising:
a mechanical structure having a first side and a second side opposite said first side, said mechanical structure lacking a perforation between said first side and said second side;
a vibrational actuator situated on said first side of said mechanical structure, said vibrational actuator configured to provide vibrational energy;
a work piece situated on said second side of said mechanical structure, said work piece configured to receive vibrational energy and to convert said vibrational energy into mechanical motion.

2. The apparatus of claim 1, wherein said vibrational actuator is a piezoelectric actuator.

3. The apparatus of claim 1, wherein said vibrational actuator is an electrostrictive actuator.

4. The apparatus of claim 1, wherein said vibrational actuator is a magnetostrictive actuator.

5. The apparatus of claim 1, wherein said work piece is configured to convert said vibrational energy into linear mechanical motion.

6. The apparatus of claim 1, wherein said work piece is configured to convert said vibrational energy into rotary mechanical motion.

7. The apparatus of claim 1, wherein said vibrational actuator is configured to provide vibrational energy at a fundamental frequency.

8. The apparatus of claim 7, wherein said work piece is configured to convert said vibrational energy at said fundamental frequency into motion having a first sense.

9. The apparatus of claim 7, wherein said vibrational actuator is configured to provide vibrational energy at a frequency which is a multiple of said fundamental frequency.

10. The apparatus of claim 9, wherein said work piece is configured to convert said vibrational energy at said frequency which is a multiple of said fundamental frequency into motion having a second sense opposite to said first sense.

11. The apparatus of claim 1, wherein a plane within said mechanical structure is a nodal plane of said vibrational energy.

12. The apparatus of claim 1, wherein said vibrational energy can be described by a periodic function.

13. A method of passing vibrational energy through a structure lacking a penetration, comprising the steps of:
providing an apparatus, comprising:
a mechanical structure having a first side and a second side opposite said first side, said mechanical structure lacking a perforation between said first side and said second side;
a vibrational actuator situated on said first side of said mechanical structure, said vibrational actuator configured to provide vibrational energy; and
a work piece situated on said second side of said mechanical structure, said work piece configured to receive vibrational energy and to convert said vibrational energy into mechanical motion;
activating said vibrational actuator to generate vibrational energy; and
receiving said vibrational energy with said work piece; and
providing mechanical motion generated by a response of said work piece to said received mechanical energy.

14. The method of passing vibrational energy through a structure lacking a penetration of claim 13, wherein said vibrational actuator is a selected one of a piezoelectric actuator, an electrostrictive actuator, and a magnetostrictive actuator.

15. The method of passing vibrational energy through a structure lacking a penetration of claim 13, wherein said work piece is configured to convert said vibrational energy into linear mechanical motion.

16. The method of passing vibrational energy through a structure lacking a penetration of claim 13, wherein said work piece is configured to convert said vibrational energy into rotary mechanical motion.

17. The method of passing vibrational energy through a structure lacking a penetration of claim 13, wherein said vibrational actuator is configured to provide vibrational energy at a fundamental frequency.

18. The method of passing vibrational energy through a structure lacking a penetration of claim 17, wherein said work piece is configured to perform at least one of: convert said vibrational energy at said fundamental frequency into motion having a first sense, provide vibrational energy at a frequency which is a multiple of said fundamental frequency, and convert said vibrational energy at said frequency which is a multiple of said fundamental frequency into motion having a second sense opposite to said first sense.

19. The method of passing vibrational energy through a structure lacking a penetration of claim 13, wherein a plane within said mechanical structure is a nodal plane of said vibrational energy.

20. The method of passing vibrational energy through a structure lacking a penetration of claim 13, wherein said vibrational energy can be described by a periodic function.

* * * * *

UNITED STATES PATENT AND TRADEMARK OFFICE
CERTIFICATE OF CORRECTION

PATENT NO. : 9,748,870 B2
APPLICATION NO. : 14/557844
DATED : August 29, 2017
INVENTOR(S) : Stewart Sherrit et al.

Page 1 of 1

It is certified that error appears in the above-identified patent and that said Letters Patent is hereby corrected as shown below:

On the Title Page

• In item (72) in the listing of Inventors, please change the spelling of the first inventor's name from "Stewart Sherril" to "Stewart Sherrit".

Signed and Sealed this
Seventh Day of November, 2017

Joseph Matal
*Performing the Functions and Duties of the*
*Under Secretary of Commerce for Intellectual Property and*
*Director of the United States Patent and Trademark Office*